July 26, 1960 A. LERBS 2,946,919

ION SOURCES USING A HIGH-FREQUENCY FIELD

Filed Sept. 18, 1957 3 Sheets-Sheet 1

INVENTOR

ALFRED LERBS

BY Paul M. Craig, Jr.

ATTORNEY

INVENTOR
ALFRED LERBS

BY Paul M. Craig, Jr.
ATTORNEY

INVENTOR
ALFRED LERBS
BY Paul M. Craig, Jr.
ATTORNEY

United States Patent Office 2,946,919

Patented July 26, 1960

2,946,919

ION SOURCES USING A HIGH-FREQUENCY FIELD

Alfred Lerbs, Frankfurt am Main, Germany, assignor to Compagnie Generale de Telegraphie Sans Fil, Paris, France Filed Sept. 18, 1957, Ser. No. 684,729

Claims priority, application France Oct. 3, 1956

17 Claims. (Cl. 315—39)

The present invention relates to ion sources operating at frequencies equal to or above 100 megacycles per second.

More particularly, the present invention has for its object the provision of an ion source which produces ions under the combined action of an electric field of ultra-high frequency and of a D.C. magnetic field.

According to the present invention, the ion source comprises, in an evacuated envelope, means to introduce therein gas under weak pressure, means to establish, at least within a portion of the volume of the envelope, a magnetic field of constant intensity, means to introduce into the envelope an ultra-high frequency having a predetermined wave length, and means for extracting ions produced thereby.

In a first embodiment according to the present invention, the intensity of the magnetic field expressed in gauss and the operating wave length expressed in centimeters are such that the product thereof is equal to a constant between 10,000 and 15,000.

According to another embodiment in accordance with the present invention, the constant has a value which is equal approximately to one half of the preceding value, namely 5,000 to 7,500.

Accordingly, it is an object of the present invention to provide an ion source which is highly efficient in operation at high frequencies.

It is another object of the present invention to provide a source of ions which is relatively simple in construction.

Still another object of the present invention resides in the provision of an ion source which utilizes an electric field of ultra-high frequency and a D.C. magnetic field.

These and other objects, features and advantages of the present invention will become more obvious when taken in connection with the accompanying drawing which shows, for purposes of illustration only, several embodiments in accordance with the present invention, and wherein.

Figures 4 through 8 indicate various embodiments to obtain the magnetic field appropriate in particular with an ion source in accordance with the present invention;

Figures 9 through 12 indicate various embodiments to supply the high-frequency wave, and Figures 13 to 19 illustrate several further non-symmetrical embodiments of ion sources in accordance with the present invention which do not possess a symmetry of revolution.

Figure 1:
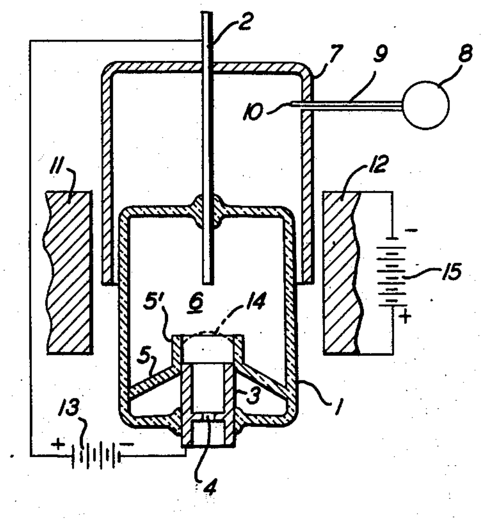
Figure 1 is a schematic axial cross-sectional view of a first embodiment of a source of ions in accordance with the present invention.

Referring now to the drawing, wherein like reference numerals are used throughout the various views to designate like parts, and more particularly to Figure 1, reference numeral 1 designates a glass envelope of cylindrical shape which is traversed along the axis at one end thereof by a metallic tubulure 2, and at the other end thereof by a second metallic tubulure 3 of a diameter which is distinctly larger than that of the first tubulure 2. The metallic tubulure 3 is provided with an apertured restricted portion 4. A bell-shaped portion 5 made of glass, which is coaxial with the glass envelope 1 and which terminates in a tubulure 5' constituting essentially an extension of the tubulure 3, is secured in any suitable manner, for example, welded, to the glass envelope 1.

The glass envelope 1 and the bell-shaped portion 5 delimit a space 6 which constitutes the ionization space. The tubulure 2 enables the introduction into the space 6 of a gas to be ionized at a weak pressure. The tubulure 2 comprises a metallic coating or covering which constitutes the central conductor of a coaxial line of which the external conductor is designated by reference numeral 7. A microwave oscillator tube, for example, a magnetron 8, produces high-frequency energy which is transmitted to the coaxial cable 2 and 7, by the intermediary of another coaxial cable 9 and a coupling means 10 such as a loop or probe. The conductor 7 surrounds the glass envelope 1 along the upper portion thereof over a predetermined height equal approximately to a quarter wavelength at the operating frequency. A static magnetic field, directed along the axis of the tube, is provided by any suitable magnetic means such as a coil coaxial with the glass tube 1 and of which the sections have been indicated schematically only and designated by reference numerals 11 and 12. A suitable voltage source, such as battery 13, enables the electrode 3 to be placed at a negative voltage with respect to the conductor 2. A suitable voltage source, such as battery 15, supplies current to the coil 11—12. The voltage of source 15 can be adjusted to different desired values by any conventional means (not shown).

*Operation*

The operation of the ion source illustrated in Figure 1 is as follows:

The high-frequency oscillator, for example, a magnetron 8, excites or energizes the electrodes formed by coaxial cable 2 and 7 by the intermediary of the coaxial cable 9 and of coupling means 10. As a result of the standing waves due to the open-end termination of the coaxial, a loop of high-frequency voltage is produced at the open end of the coaxial cable 2, 7. The high-frequency field necessary for ionization is thereby produced by this method in the space 6. The magnetron 8 operates at a fixed wavelength; a particularly great stability in frequency, however, is not required. With the batteries 13 and 15 properly operating, that is, with the electrode 3 at a negative potential with respect to the conductor 2 and the coil 11, 12 assuring the existence of a magnetic field in the space 6, a plasma which occupies the upper part of the space 6 is established if gas at relatively weak pressure is introduced into the space 6 through the tubulure 2. This plasma is in contact with the conductor 2 and is, therefore, placed at a positive potential. In contrast thereto, the plasma is repelled from the electrode 3 which is at a negative potential and a space void of ions is thereby produced between the plasma and the electrode 3. The plasma is effectively limited downwardly by a surface sufficiently well defined, of concave form, as seen from the electrode 3 and which has been represented in Figure 1 by the dash line 14. Everything takes place in the production of ions as if the ions were emitted by the surface 14. Thanks to the particular shape of the surface 14 and to the difference in potential between the plasma and the electrode 3, an electrostatic field is produced which focuses the ions thus produced in such a manner that the ions appear at first in the form of a convergent beam and thereupon in the form of a divergent beam. By modifying the voltages and the shape of the electrode 3, a cross-over point in the ion path or trajectory may be obtained which is located at the level of the restricted portion 4.

The action of the D.C. magnetic field is particularly important.

Figure 2:
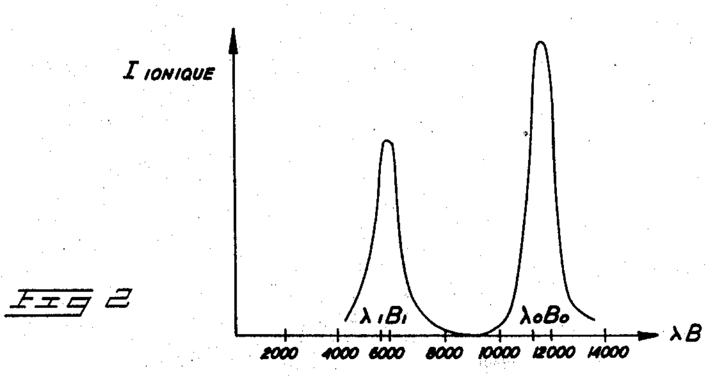
Figure 2 is an explanatory graph.

The difference in potential between the electrodes 2 and 3 being fixed at a few hundred volts, and the magnetron 8 producing ultra-high frequency energy at a predetermined wave length, if now the intensity of the magnetic field is increased progressively, and if one plots the curve of the intensity of the ion beam produced as a function of the product of the intensity of the magnetic field times the wave length of the ultra-high frequency energy, a curve is obtained which has the shape of that indicated in Figure 2. This curve passes successively through two very pronounced peaks or maxima, the second maxima with an abscissa value of $\lambda_0 B_0$ having an ordinate which is approximately twice that of the first abscissa $\lambda_1 B_1$, whereby the output corresponding to the second maximum or peak is particularly large.

It may be readily demonstrated that for this value, $\lambda_0 B_0$, the following relationship between the magnetic field, expressed in gauss, and the operating wavelength of the ultra high-frequency oscillator 8, expressed in centimeters, is obtained:

$$\lambda_0 B_0 = K = \text{Constant} \qquad (1)$$

The value of this constant K depends on the dimensions of the various parts of the apparatus but remains independent of the intensity of the ion source and of the electric field applied. With an experimental tube, it has been found that this constant amounted to $K=11,600$.

If the first maximum is taken as the operating point, though less pronounced than the second, there still exists a relation of the same type, the constant being about equal to one half the value indicated and found hereinabove.

The following approximate physical explanation of the operation of the ion source in accordance with the present invention may be given, it being understood that this explanation is only given as an attempted explanation of purely illustrative nature, the degree of accuracy of which in no way affects the value of the present invention.

Even though it is understood that there is no creation of electron, produced by a hot cathode, in the envelope 1, there exists always a certain number of electrons in the so-called "free state" which are present in the space 6. Under the simultaneous influence of the high-frequency field and of the magnetic field, and supposing that one of the two following conditions is fulfilled, namely:

$$\lambda B = K \text{ or } \lambda B = \frac{K}{2}$$

The electrons undertake, thanks to a resonance phenomenon, gyratory movements of which the amplitude and speed proceed in amplifying themselves as long as the phase is favorable, that is, the more the electrons are in favorable condition to extract energy from the high-frequency field. However, the electrons do not always remain in phase with the high-frequency field by reason of the fact of the modification of the characteristics of the movements thereof. After having described a certain number of circular trajectories, the phase conditions become less favorable, the electrons are braked by the high-frequency field to which they give up a part of the kinetic energy thereof and thereupon favorable phase conditions will again appear and so forth.

It may be seen, therefore, that even with a relatively weak high-frequency power, when resonance conditions have been attained, the free electrons which are present in the space are sufficiently accelerated to set off the mechanism of ionization by shocks between the electrons and the gaseous molecule. During the occurrence of these shocks, electrons are liberated which are then accelerated in turn and participate thereupon in the phenomenon of production of ions. The ionization presents very rapidly a great intensity and a plasma is rapidly established in the space 6.

The static electric field which is present between the electrodes 2 and 3 has no influence whatsoever on the ionization. Nevertheless, this field is useful for focusing the ion trajectories and for the extraction of the ions as has been indicated hereinabove.

Experiments carried out with a constant magnetic field which satisfy the relationship $\lambda B$ approximately equal to K ($\lambda B \approx K$), have indicated that the output of the apparatus increases in a manner essentially proportional to the power of the applied high frequency in the space 6. Below a certain minimum value, of the order of five to eight watts in case of the tube used in tests, no phenomenon whatsoever of ionization was observed. The same is true for the pressure of the gas in the absence of the magnetic field with a high-frequency power, no matter how great. Conclusive tests have been conducted for a wavelength of the order of twenty centimeters.

Figure 2 represents the intensity of the ion current in its relative value as a function of the product $\lambda \cdot B$ where $\lambda$ is expressed in centimeters and B in gauss. This curve has been plotted for $\lambda=23$ cm. and a constant high-frequency power.

From the relationship $\lambda \cdot B = K$, verified when the apparatus according to the present invention functions best, important conclusions and consequences may be derived therefrom as follows:

(*a*) The existence of a magnetic field which participates effectively in the ionization phenomenon enables the electrons to attain speeds much higher with a clearly lesser high-frequency power. The path traversed by an electron is much longer than in the prior art device and the probability of successive collisions of an electron with several gas molecules is considerably increased. The ionization ratio is, therefore greater.

(*b*) The ionization may take place in a restricted volume, the electrons being able to execute circular movements without transverse displacement.

(*c*) By acting on the operating wavelength of the ultra-high-frequency generator, for example, by reducing the same, and by increasing correspondingly the intensity of the magnetic field in such a manner as to maintain the relation $\lambda \cdot B = K$, it is possible to concentrate the ionization in a restricted part of the tube, whereby the focusing of the beam of ions is greatly facilitated. Furthermore, it is possible to restrict the ionization to a predetermined region in the tube of which the limits are at the disposition of the operator by utilizing a non-homogeneous magnetic field in the ionization space as will be described more fully hereinafter.

(*d*) The theory of the operation in accordance with the present invention indicates and the actual tests confirm that the quantity of high-frequency energy necessary for ionization is considerably less than in the ion sources of the prior art. This is a result of the fact that the tube operates under resonance conditions. A considerable reduction of calorific losses results therefrom; it is, therefore, possible to obtain an ion beam of great intensity without prohibitive heating. Almost the totality of the energy is consummated for purposes of ionization. The efficiency of the source is, therefore, excellent. The ionization zone is no longer limited by the envelope of the discharge tube and may be restricted to a part of the space thereof.

Under certain utilization conditions in which a lower efficiency is acceptable, it is possible to operate under the operating conditions corresponding to the point of the curb of Figure 2 having an abscissa $\lambda_1 B_1$. The product $\lambda B$ then having a value one half of that of the preceding value, it is possible to divide by two the operating wave length of the ultra-high-frequency oscillator, or the intensity of the magnetic field, or accept suitable reductions in one or the other. The interest is such reductions is incontestible in practice.

The efficiency of the ion source in accordance with the present invention is so highly satisfactory that it offers no inconvenience in introducing the gas to be ionized into the ionization space at a weaker pressure than that ordinarily admitted in known prior art sources, for example, at $10^{-2}$ mm. of mercury.

The following is a non-limitative description of some other embodiments of ion sources in accordance with the present invention.

Figure 3:
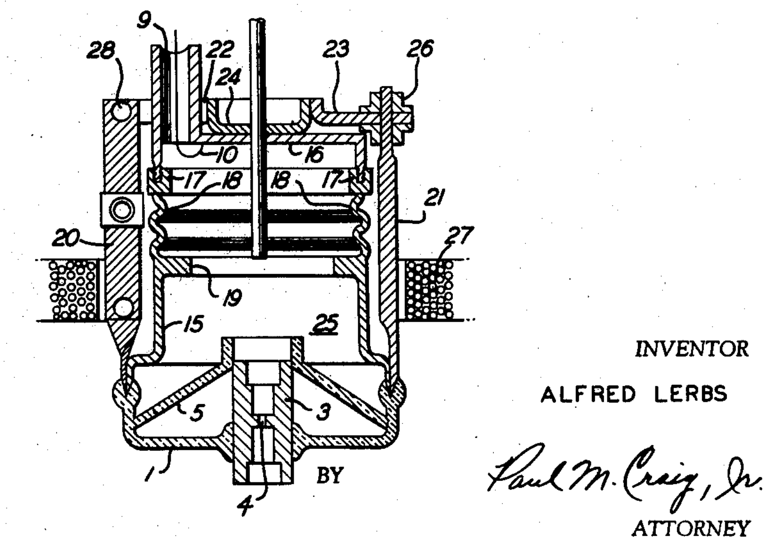
Figure 3 is a schematic axial cross-sectional view through another embodiment of an ion source in accordance with the present invention.

In the embodiment shown in Figure 3, the base of the insulating envelope 1 has the same structure as that in the case of Figure 1, the same reference numerals designating again the same elements as in Figure 1. However, the metallic electrode 3 in the form of a tube comprises a stepped restricted portion 4. The envelope 1 includes in addition a metallic wall 15 with a cover 16 screwed at 17 onto the wall 15, the latter including a deformable wall portion 18 and an internal shoulder 19. A deformation system for changing the volume of the ionization space comprises a guide flange 22 supported by a sleeve 20, and an arm 23 sealed to a cup-shaped part 24, which produces the deformation of the metallic cavity 25 of the tube when the nut 26 is screwed onto the sleeve 21. The high-frequency energy is furnished directly to the cavity 25 by the loop 10 and by the coaxial cable 9, the ultra-high-frequency generator 8 not having been shown in this figure. A flat circular coil 27 which is coaxial with the axis of the tube produces the desired magnetic field.

*Operation*

The operation of the embodiment shown in Figure 3 is the same as that of Figure 1. However, it might be worth while to note the following features:

The ionization space is constituted by a metallic cavity which may be tuned by deformation to the particular wavelength used.

If a metallic surface is in contact with the ionized gas, the coefficient of recombination of the metal, being much higher than that of glass, lowers the efficiency of the tube. The interior surface is, therefore, covered with a substance having a weak coefficient of recombination. The layer being thin, it also results therefrom a reduction of dielectric losses.

The apparatus of Figure 3 may be readily disassembled. For that purpose, it suffices to unscrew the nut 26 and to lift the pivot 28 to unscrew the lid 16 at 17. Ready access to the interior of the apparatus is thereby had. The substance destined to combat the recombination of the ion may be in the form of thin leaves covering the interior of the cavity and, consequently, may be interchangeable.

If the excitation current of the magnetizing coil 12 or 27 is increased in a continued manner from a value of 0, the intensity of the magnetic field $B_0$ necessary to realize resonance condition at a wavelength fixed in advance, is obtained at first in the horizontal plane of symmetry of the coil. If the exciting current of the coil is then continued to be increased, the zone in which there is a field having a value $B_0$ is divided into two symmetric zones displaced with respect to the preceding plane and which move away progressively and equally on both sides of this plane at a rate at which the excitation current increases. It is, therefore, possible by the use of such a coil to obtain a proper and good localization of the ionization zone. This possibility is important in practice for it permits to influence the efficiency of the source, the importance of the thermal losses, and the focusing of the ion beam at the output of the plasma.

Figure 4:
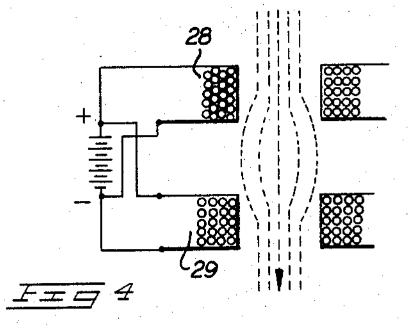
Figure 5:
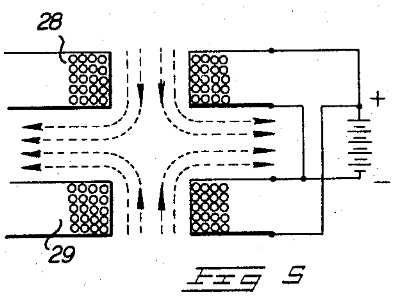

Figures 4 and 5 show two other embodiments of an arrangement for a generator of the magnetic field. In these figures, the magnetic lines of force of the field have been indicated schematically. In Figure 4, the current which flows through two coils 28 and 29 has the same direction whereas, in Figure 5, the currents flow therethrough in opposite directions. The coils 28 and 29 are circular as in the case of Figure 3. These coils 28 and 29 have been indicated simply in cross section through an axial symmetrical plane. The actual configurations are revolutions about a vertical axis. The distance between the two coils as well as the positions thereof with respect to the ionization space are adjustable.

Figure 6:
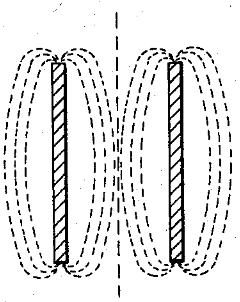
Figure 7:
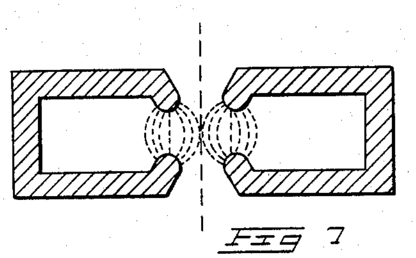

Figures 6 and 7 represent schematically the lines of force of a field created by permanent magnets of revolution about a vertical axis. Only the meridian thereof has been indicated for sake of simplicity.

The permanent magnet of Figure 6 is of tubular shape whereas that of Figure 7 has a more complicated shape.

Figure 8:
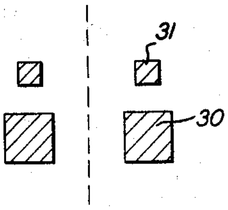

Figure 8 indicates schematically in axial cross section a device 30 which enables the production of a magnetic field such as an electromagnet, a permanent magnet or a coil. The element 31 is an annulus of soft iron which enables modification of the shape of the magnetic field and which, consequently, permits to control the limits of the zones in which ionization may be effectively produced. It is also possible to utilize several annuli of soft iron or any combination thereof with the arrangements of the preceding figures.

Figure 9:
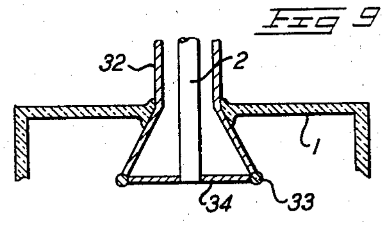
Figure 10:
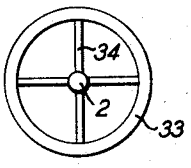

Figure 9 shows in axial cross section and Figure 10 in bottom view thereof a modification of the coupling means of the ultra-high-frequency to the apparatus under consideration. It is applicable to all the different embodiments in accordance with the present invention.

The conductor 2 of the coaxial line has the same position as previously and is hollow to permit introduction therethrough of the gas to be ionized. The external conductor 32 of the coaxial line, which corresponds to the outer conductor, designated by reference numeral 7 in Figure 1 and shown therein disposed externally of the discharge tube, in the embodiment of Figures 9 and 10 penetrates into the interior of the tube and extends on the inside of the envelope 1 in a flared manner. The outer conductor 32 is terminated by an annulus 33 connected to the end of the conductor 2 by radial spokes 34. The loop of the high-frequency field is supported by the annulus 33 and the open end of the conductor 2. The high-frequency power supplied by the coaxial line is thus distributed in a space perfectly delimited in which takes place the ionization. It follows therefrom that the dielectric losses in the envelope 1 are avoided.

Figure 11:
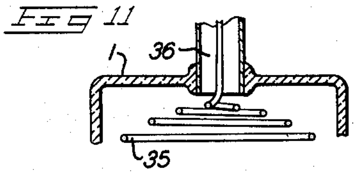
Figure 12:
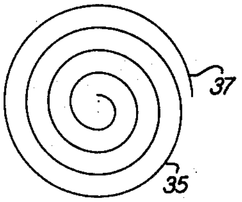

The embodiments described hereinabove illustrate arrangements which function with stationary waves. It is equally possible to utilize travelling waves. Figure 11 shows in axial cross section and Figure 12, in bottom view thereof, an embodiment in which the high-frequency circuit is constituted by a wire rolled into a spiral 35, the spiral 35 additionally presenting the general form of a basket. The central conductor of the coaxial line 36 through which the high-frequency energy is supplied is connected to the spiral 35 at the central point thereof. The high-frequency energy propagates along the line 35 and the greatest part thereof is absorbed by ionization. The transmitted wave is reflected at the free end 37 of the line and is practically absorbed totally during the return or backward travel, it being assumed that the magnetic field has an appropriate value. The basket form of the spiral 35 such as illustrated in Figure 11 permits better focusing of the ion beam.

The symmetry of revolution does not constitute a critical condition. All that has been indicated hereinabove in connection with symmetrical constructions is also true for other embodiments. It is within the scope of a person skilled in the art to modify the form of the apparatus illustrated and described hereinabove to permit obtainment of a flat brush-shaped beam of ions at the height of the restricted portion 4 (Figures 1 and 3) in the place of a wire-like beam. It is understood, of course, that the form of the constriction 4 is modified accordingly as a result thereof.

Several embodiments in accordance with the present invention which do not provide a circular symmetry will now be described hereinafter, for purposes of illustration.

Figure 13:
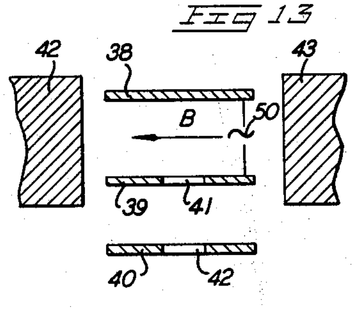
Figure 14:
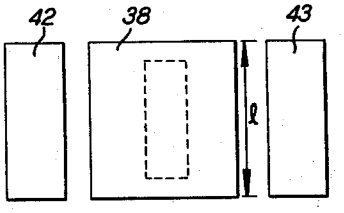

According to the schematically illustrated embodiment of Figure 13, which shows a transverse cross section, and of Figure 14, which shows a top view thereof, the high-frequency electrodes are constituted by two plates 38 and 39, which are metallic, parallel and disposed between the pole pieces 42 and 43 of an electromagnet or of a permanent magnet producing a field parallel to the plates. A high-frequency generator excites a high-frequency field between the plates 38 and 39 by means of a transmission line. This means producing the excitation of the high-frequency field has been symbolically designated in the drawing by reference numeral 50. The direction of the high-frequency field is perpendicular to that of the magnetic field. A third electrode 40 is disposed parallel with the two first-mentioned electrodes 38 and 39. The electrodes 39 and 40 are provided with windows 41 and 42, respectively, for the extraction of ions. If no difference of D.-C. potential exists between the plates 38 and 39, the plate 40 is placed at a negative potential with respect to the plate 39 to permit the extraction of ions. By placing the plate 39 at a slightly negative voltage with respect to the plate 38, the ions pass normally through the window 41 and the plate 40 thereby serves as accelerating electrode.

Figure 15:
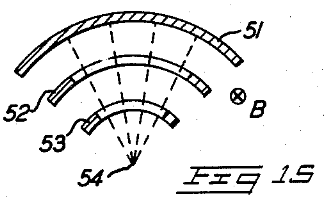

Figure 15 illustrates an improvement over the arrangement according to Figures 13 and 14 which consists in bending the electrodes 38, 39 and 40 into the shape of electrodes 51, 52 and 53, respctively, as shown in Figure 15 is such a manner that the curved portions thereof belong to three coaxial cylinders. In establishing a magnetic field parallel to the common axis to these three cylinders favors the focusing of the ions along the common axis 54. The extraction of ions takes place thereby parallelly to the direction of the lines of force of the high-frequency field. It is also possible to realize an arrangement for extracting the ions in which the extraction of ions takes place perpendicularly to the direction of the lines of force of the high-frequency field.

Figure 16:
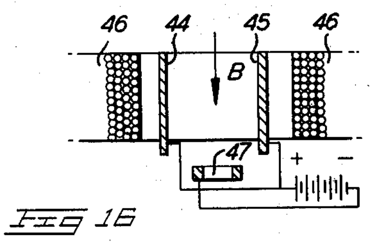
Figure 17:
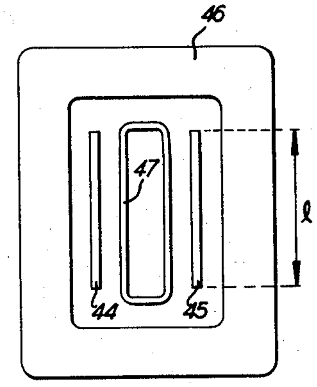

According to the embodiment indicated schematically in Figures 16 and 17, where Figure 16 is a transverse cross section and Figure 17 a top view thereof, two high-frequency electrodes are constituted by two plates 44 and 45. The magnetic field is furnished by a flat coil 46 of rectangular cross section. In that arrangement, the high-frequency electrodes 44 and 45 are normally at the same static potential. An electrode 47 having a negative potential with respect to the plates 44 and 45 is utilized to focus the ion beam.

Figure 18:
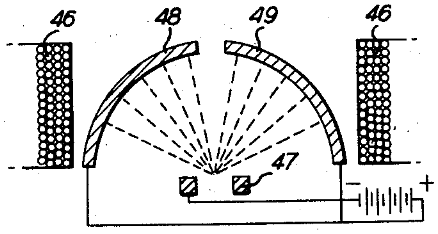

Figure 18 represents a variation of the embodiment illustrated in Figure 16. The plane electrodes 44 and 45 of the arrangement according to Figure 16 are replaced therein by metallic electrodes 48 and 49 which are parallel and curved in the shape of arcs of circles, the axis of the cylinder coinciding with the axis of the slot provided in the electrode 47. The shape of these electrodes favors focusing of the ions.

The dimension *l* of the plates 38 and 39 (Figures 13 and 14) as well as that of the plates 44 and 45 (Figures 16 and 17) must be relatively small with respect to the wavelength of the high-frequency field utilized so that one might have a reasonable certainty that the quasi-stationary conditions of operations are assured. For example, if the wavelength is between 0.2 and 1 meter, the length *l* must not exceed 10 cm.

The condition according to which the dimensions of the plates limiting the ionization space must be small as compared to the operating wavelength may appear to introduce a practical limitation to the utilization of the arrangement according to the present invention. A means to avoid this limitation consists in connecting the plates limiting the ionization space with each other at each of the two ends thereof in such a manner as to produce a Lecher line. This arrangement enables to obtain an effective length *l* of the elements which is sufficiently great even at small wavelengths. The length of the plates is then equal to one half the wavelength at resonance. This property may be deduced directly from the consideration of the distribution of the high-frequency field over the plates. Such a disposition presents still another advantage, namely, the intensity of the high-frequency field is symmetrically distributed, it is a maximum at the center of the electrodes and a minimum at the ends thereof. The intensity of ionization thereby is distributed in an analogous manner between the electrodes. It is maximum at an equal distance from the ends of the electrodes and decreases equally on both sides from this point. Such a distribution of the ionization is particularly favorable for proper focusing of the ion beam.

Figure 19:
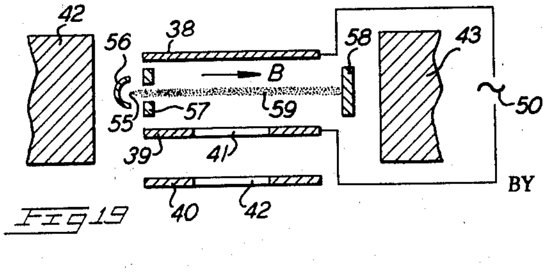

Figure 19 finally represents schematically an embodiment in which a source of auxiliary electrons permits a reduction in the time necessary to establish the discharge. Such an improvement is of particular interest in a pulse-type arrangement which operates by means of pulses of short duration. In the embodiment schematically shown in Figure 19, the same reference numerals designate the same elements as in Figure 13. A filament 55, surrounded by electron optical elements 56 and 57 emits by thermal emission an electron beam 59 which is plane and parallel to the high-frequency electrodes 38 and 39, which beam 59 is collected by a collector 58, in the absence of the high-frequency field.

It is understood that the various embodiments illustrated and described herein have been shown and described only for purposes of illustration but are susceptible of many changes and modifications within the spirit of the present invention. In particular, the high-frequency electrodes may be disposed at the interior or on the exterior of the tube or may be combined with the envelope of the tube. The direction of the magnetic field may be either parallel or perpendicular to the direction of the extraction of the ions. Furthermore, suitable electrostatic fields may be used within the ionization space to facilitate the extraction of the ions.

Thus, while I have shown and described several embodiments in accordance with the present invention, it is understood that the same is not limited thereto but is susceptible of many changes and modifications within the spirit of the present invention, and I intend to encompass all such changes and modifications as encompassed by the appended claims.

I claim:

1. An ion source including an ionization space formed by a vacuum-tight envelope, a source of ultra-high frequency energy, a coaxial line portion having a hollow inner conductor and having one of its ends terminated at said ionization space while the other end thereof is closed by a metallic cover traversed by said hollow conductor, means for coupling said coaxial line portion to said ultra-high frequency source thereby to induce in said ionization space an ultra-high frequency wave, means for establishing in said ionization space an electrostatic field so that the lines of force thereof and the lines of force of the electric ultra-high frequency field have a common axis of symmetry, said hollow conductor being disposed along said axis of symmetry, means for establishing in said ionization space a constant intensity magnetic field having lines of force substantially perpendicular to those of the ultra-high frequency electric field, and means for introducing gas to be ionized into said ionization space through said hollow conductor, said ionization space comprising a cylinder closed at the extremity remote from said coaxial line by a cover made of insulating material, a metal tube traversing said cover and provided with a diaphragm having an aperture for extracting ionized gas, and means for raising said hollow inner conductor to a positive potential with respect to said metal tube.

2. An ion source including an ionization space formed by a vacuum-tight envelope, a source of ultra-high frequency energy, a coaxial line portion having a hollow inner conductor and having one of its ends terminating at said ionization space while the other end thereof is closed by a metallic cover traversed by said hollow conductor, means for coupling said coaxial line portion to said ultra-high frequency source thereby to induce in said ionization space an ultra-high frequency wave, means for establishing in said ionization space an electrostatic field so that the lines of force thereof and the lines of force of the electric ultra-high frequency field have a common axis of symmetry, said hollow conductor being disposed along said axis of symmetry, means for establishing in said ionization space a constant intensity magnetic field having lines of force substantially perpendicular to those of the ultra-high frequency electric field, and means for introducing gas to be ionized into said ionization space through said hollow conductor, the intensity B, expressed in gauss, of the magnetic field and the wave length λ, expressed in cms., of the ultra-high frequency wave being so chosen that the product Bλ in gauss-cm. is equal to a value selected in one of the ranges 10,000 to 15,000 and 5,000 to 7,500.

3. An ion source according to claim 2, wherein said coaxial line portion is so dimensioned as to display a loop of voltage for standing waves at the end adjacent the ionization space.

4. An ion source according to claim 2, wherein the ionization space comprises a cylinder closed at the extremity remote from said coaxial line by a cover made of insulating material, a metal tube traversing said cover and provided with a diaphragm having an aperture for extracting ionized gas, and means for raising said hollow inner conductor to a positive potential with respect to said metal tube.

5. An ion source according to claim 4, wherein said cylinder is made of insulating material and closed at the extremity thereof adjacent the coaxial line by a cover of insulating material traversed by said hollow inner conductor.

6. An ion source according to claim 5, wherein said coaxial line portion surrounds the ionization space over a length of substantially λ/4.

7. An ion source according to claim 5, wherein said coaxial line portion is surrounded by the ionization space over a length of substantially λ/4.

8. An ion source according to claim 7, wherein said coaxial line includes an outer conductor of smaller diameter than said envelope and having a bell-mouthed extremity extending into said envelope, and means including radial connecting rods for attaching said bell-mouthed extremity to said hollow conductor.

9. An ion source according to claim 2, wherein said cylinder comprises a deformable portion, the volume of which can be adjusted at will.

10. An ion source according to claim 2, comprising within said ionization space a conductor wound in a dish-shaped spiral around said hollow conductor and connected thereto by one of its extremities while the other extremity is left free.

11. An ion source including an ionization space formed by a vacuum-tight envelope, means for establishing in said ionization space an electrostatic field, means for inducing in said ionization space an ultra-high-frequency electromagnetic wave in such a way that the electric lines of force thereof and those of the electrostatic field have a common axis of symmetry, means for introducing gas to be ionized into said ionization space at a point of said common axis, and means for establishing in said ionization space a constant intensity magnetic field having lines of force substantially perpendicular to the electric lines of force of the ultra-high-frequency wave, the intensity B, expressed in gauss, of the magnetic field and the wave length λ, expressed in cms., of the electromagnetic wave being so chosen that the product Bλ in gauss-cm. is equal to a value selected in one of the ranges 10,000 to 15,000 and 5,000 to 7,500.

12. An ion source according to claim 11, including within said ionization space three metallic parallel plates brought at least to two different electrostatic potentials, two adjacent plates of said three being provided with apertures for evacuating ionization gas.

13. An ion source according to claim 11, comprising within said ionization space two parallel metallic plates electrically connected therebetween and an electrode disposed at equal distances from and brought to a negative potential with respect to said two plates.

14. An ion source according to claim 11, including for producing in said ionization space a beam of electrons so as to reduce the time required to establish the discharge therein.

15. An ion source according to claim 11, wherein the means for establishing the magnetic field includes at least one essentially flat coil and means for adjusting the effective ionization space in said chamber.

16. An ion source comprising a vacuum tight envelope forming an ionization chamber, means for introducing gas under low pressure into said ionization chamber, first electrode means at least partially within said envelope, means for supplying ultra-high-frequency energy to said electrode means for producing an ultra-high-frequency field in said ionization chamber, means for establishing a constant intensity magnetic field within said chamber participating with said ultra-high-frequency field to define an ionizing space for ionizing said gas, a further electrode means in said chamber having an aperture through which ions may be extracted from said space, means for energizing said further electrode means at a negative potential relative said first-mentioned electrode means for directing a beam of ions through said aperture, and means for adjusting the intensity B of said magnetic field and the wave length λ of said ultra-high-frequency energy to peak ionizing values at said space, the product Bλ in gauss-cm. being selected from the ranges consisting of 5,000 to 7,500 and 10,000 to 15,000.

17. An ion source according to claim 16, wherein the product of B and λ is selected in the range of 5,000 to 7,500.

References Cited in the file of this patent

UNITED STATES PATENTS

| | | |
|---|---|---|
| 2,557,961 | Goldstein et al. | June 26, 1951 |
| 2,633,539 | Altar | Mar. 31, 1953 |
| 2,670,649 | Robinson | Mar. 2, 1954 |
| 2,798,181 | Foster, Jr. | July 2, 1957 |
| 2,826,708 | Foster, Jr. | Mar. 11, 1958 |
| 2,831,134 | Reifenschweiler | Apr. 15, 1958 |